United States Patent [19]
Blanchard et al.

[11] Patent Number: 4,581,343
[45] Date of Patent: Apr. 8, 1986

[54] PROCESS FOR THE PREPARATION OF A POLLUTION CONTROL CATALYST FOR INTERNAL COMBUSTION ENGINE EXHAUST SYSTEM/CATALYTIC CONVERTER

[75] Inventors: Gilbert Blanchard, Le Plessis Belleville; Jean-Pierre Brunelle, Saint Brice Sous Foret; Richard Doziere, Beynes; Emmanuel Goldenberg, Poissy; Michel Prigent, Rueil Malmaison, all of France

[73] Assignee: Pro-Catalyse, Rueil Malmaison, France

[21] Appl. No.: 610,498

[22] Filed: May 15, 1984

[30] Foreign Application Priority Data

May 19, 1983 [FR] France .................. 83 08284

[51] Int. Cl.$^4$ .................. B01J 23/10; B01J 23/62; B01J 23/64; B01J 23/70
[52] U.S. Cl. .................. 502/241; 502/242; 502/245; 502/250; 502/251; 502/254; 502/257; 502/259; 502/260; 502/261; 502/262; 502/263; 502/303; 502/304; 423/213.5
[58] Field of Search .......... 502/261, 303, 304, 241, 502/242, 245, 250, 251, 254, 257, 259, 260, 262, 263; 423/213.5

[56] References Cited

U.S. PATENT DOCUMENTS

| 4,283,308 | 8/1981 | Ohara et al. | 502/304 X |
| 4,378,307 | 3/1983 | Brunelle et al. | 502/258 X |
| 4,426,319 | 1/1984 | Blanchard et al. | 502/304 X |

Primary Examiner—W. J. Shine
Attorney, Agent, or Firm—Burns, Doane, Swecker & Mathis

[57] ABSTRACT

A pollution control catalyst for a catalytic converter in the exhaust system of an internal combustion engine, which catalyst comprises a support impregnated with (i) at least one platinum group precious metal, and with (ii) cerium base metal, or a combination of cerium and at least one other base metal, is facilely prepared by (1) impregnating a catalyst support with precursor compounds of said cerium base metal, or of said cerium base metal and of at least one other base metal, (2) activating said impregnated support, under a neutral or oxidizing atmosphere, at a temperature ranging from 120° to 800° C., (3) impregnating said catalyst support with precursor compounds of said at least one platinum group precious metal, together with a delayed-action organic reducing agent, inactive under cold conditions, which effects reduction of said platinum group precious metal precursor compounds, but not of any cerium or other base metal precursor compounds, under the conditions of the step (4) below, and (4) activating said impregnated catalyst, also under a neutral or oxidizing atmosphere, at a temperature ranging from 300° to 800° C.

13 Claims, No Drawings

PROCESS FOR THE PREPARATION OF A POLLUTION CONTROL CATALYST FOR INTERNAL COMBUSTION ENGINE EXHAUST SYSTEM/CATALYTIC CONVERTER

BACKGROUND OF THE INVENTION

1. Field of the Invention

The present invention relates to improved catalysts for the treatment of exhaust gases from spark ignited internal combustion engines, and, more especially, to the preparation of such catalysts for the treatment of exhaust gases from internal combustion engines, which catalysts effect not only the oxidation of carbon monoxide and of the hydrocarbons present in said exhaust gases, but also, optionally simultaneously, the reduction of the nitrogen oxides present in these gases.

2. Description of the Prior Art

In general, the catalysts suitable for the catalytic oxidation and optionally for the catalytic reduction of the constituents present in the exhaust gases from spark ignited internal combustion engines comprise a support or carrier which is coated and/or impregnated with at least one precious metal from the platinum group, such as platinum, rhodium, ruthenium, palladium or iridium, and at least one base metal, these base metals typically being selected from among: cobalt, zinc, manganese, nickel, tungsten, cerium, iron, copper, neodymium, praseodymium, rhenium, yttrium, magnesium, chromium, zirconium, molybdenum, lanthanum, tin, calcium, strontium and barium.

Such catalysts are typically prepared by conventional technique either by impregnation of the support or by the introduction of the metals of the active phase during the manufacture or production of the support (carrier). In general, this is done by impregnation of the support with solutions of inorganic or organic compounds of the metals sought to be introduced.

Thus, according to published European Patent Applications Nos. 27,069, 54,472 and 60,740, assigned to the assignee hereof, it is known to produce multifunctional catalysts for the treatment of exhaust gases from internal combustion engines either by (i) successive impregnation of the support with a solution containing compounds of iron and of cerium, and then with a solution containing the compounds of the precious metals of the platinum group sought to be incorporated therein, or by (ii) impregnation of the support with a solution containing a mixture of the salts of the base metals and of the precious metals sought to be incorporated. In order to obtain a high initial activity, it is generally advantageous to carry out a reduction of the precious metal compounds under hydrogen during the preparation of these catalysts. Cf. U.S. Pat. Nos. 4,378,307 and 4,426,319, also assigned to the assignee hereof.

It too is possible, according to French Pat. No. 2,196,195, to effect reduction of small amounts of the catalyst with compounds such as hydrazine which are much stronger reducing agents than hydrogen. Such a reduction is carried out at a temperature ranging from 80° to 250° C., preferably from 100° to 200° C. The process described in this '195 patent, however, is stated to be inapplicable for the treatment of large amounts of catalyst. On the other hand, reducing agents of this type are indeed quite strong, effecting the reduction of cerium dioxide ($CeO_2$), for example, when it is present in the active phase. Consequently, catalysts prepared by this particular process do not possess adequate initial activity.

SUMMARY OF THE INVENTION

Accordingly, a major object of the present invention is the provision of improved technique for the preparation of platinum group/base metal (cerium) containing catalysts, and wherein it has now surprisingly been found that unforeseen advantages are attained by incorporating into the support impregnating solution of the precious metal compounds an organic reducing agent which is inactive under cold conditions but which is effective in reducing the precursor compounds of the precious metals (albeit not capable of thus reducing any cerium or other base metal compound also present) upon final calcination of the desired catalyst. These selective acting organic reducing agents shall hereinafter be referred to as "delayed-action reducing agents". The introduction of a delayed-action reducing agent into the impregnating solution obviates the need for any hydrogen or combustion gas catalyst reduction step, and thus imparts a certain economic advantage to the process. At least as important, the final product catalysts have unexpectedly high initial activity.

Briefly, the present invention features the preparation of catalysts well suited for the treatment, e.g., in a catalytic converter, of exhaust gases from internal combustion engines, which catalysts comprise a support which is coated and/or impregnated with at least one platinum group metal and at least one base metal, with the proviso that said at least one base metal component is always comprised of cerium, and is characterized in that:

(i) in a first step, the precursor compound(s) of the base metals are incorporated onto the support or carrier;

(ii) in a second step, activation of the pre-catalyst is carried out under a neutral or oxidizing atmosphere at a temperature ranging from 120° to 800° C.;

(iii) in a third step, the precursor compound(s) of the platinum group precious metals, together with sufficient delayed-action reducing agent to effect reduction of said platinum group precursor compound(s) during the following step (iv), is/are next incorporated onto the support; and (iv) in a fourth step, the catalyst is again activated, also under a neutral or oxidizing atmosphere at a temperature ranging from 300° to 800° C.

DETAILED DESCRIPTION OF THE INVENTION

More particularly according to the present invention, exemplary of the "delayed-action reducing agents" which are simultaneously incorporated onto the support with the precious metal compounds of the platinum group are ethylene glycol (1,2-ethanediol), butylene glycol (1,3-butanediol), tetramethylene glycol (2,3-methylbutanediol), isoamylene glycol (3-methyl-1,3-butanediol), trimethylene glycol (1,3-propanediol), propylene glycol (1,2-propanediol), glycerol (propanetriol), sucrose, tetrahydrofurfuryl alcohol, phenol (hydroxybenzene), furfurol (2-furylmethanol), benzyl alcohol (α-hydroxytoluene), hexahydrobenzyl alcohol, ortho-cresol (2-hydroxytoluene), ethylene glycol diacetate, glucose, starch, 2-allyloxyethanol (glycol monoallyl ether), 2-butoxyethanol (glycol monobutyl ether), 4-methyl-1,3-dioxolan-2-one, 1,2-propanediol diacetate, 1,3-propanediol diacetate, diacetin (1,3-glycerol diacetate), 1,2-glycerol dimethyl ether (2,3-dimethoxypropanol), α-monoacetin and α-monobutyrin.

The carrier or support which is employed according to the invention may be in any convenient particulate form, or in the form of a metallic or ceramic substrate coated with a layer of suitable oxide.

The particulate carriers which are representative are in particular those selected from among: silica, alumina, aluminosilicates or mixed oxides including, for example, alumina combined with silica, zirconium oxide, cerium oxide and/or titanium dioxide, and the like.

In a preferred embodiment of the invention, a particulate carrier based on alumina is employed. This carrier preferably has a specific surface ranging from 25 to 250 $m^2/g$ and more preferably from 70 to 150 $m^2/g$. It has a total pore volume ranging from 0.5 to 2 $cm^3/g$ and more preferably from 0.8 to 1.7 $cm^3/g$. Preferably it has a macroporosity such that the pore volume of the pores whose diameter is greater than 1,000 Å ranges from about 0.05 to 0.6 $cm^3/g$ and more preferably from 0.2 to 0.5 $cm^3/g$.

Such carriers are advantageously prepared from active alumina produced according to the process described in U.S. Pat. No. 2,915,365 and may have been agglomerated according to the process described in U.S. Pat. No. 2,881,051. Same can also be prepared by autoclaving the aforesaid agglomerates in a neutral or acidic medium, drying and calcination, particularly as described in French Pat. Nos. 1,449,904 and 1,386,364.

The carriers employed can also be prepared according to the process described in published French Patent Application No. 2,399,276 or French Application No. 82/8,774.

The alumina carriers employed may also be prepared according to the process described in published European Patent Applications Nos. 15,801 and 55,164, assigned to Rhone-Poulenc.

Typically, the carriers based on alumina particles which are employed according to the invention may have been treated, as is well known to those skilled in this art, with pore-forming agents, such as those based on cellulose, naphthalene, natural gum, synthetic polymers, and the like, in order to impart to same the desired characteristics of porosity.

According to the process of the invention, supports can also be used consisting of one or more oxides coated onto a metallic or ceramic substrate, said substrate preferably being in the form of an inert and rigid honeycomb structure comprising channels or passages. Such supports are well known to those skilled in the art and have been widely described in the literature, the oxides being preferably used in the form of a film or of a coating applied to the substrate.

The oxides constituting the coating are preferably selected from among the oxides of aluminum, magnesium, calcium, strontium, barium, scandium, yttrium, lanthanides, gallium, silicon, titanium, zirconium, hafnium, thorium, niobium, tantalum, chromium, iron, tungsten, manganese and tin. It is more preferred to employ a coating of aluminum oxide.

The metallic substrates employed are preferably those obtained from alloys of iron, nickel and chromium, or those obtained from iron, chromium, aluminum and cobalt, such as those marketed under the trademark "KANTAL" or those obtained from alloys of iron, chromium, aluminum and yttrium and marketed under the trademark "FECRALLOY". The metal may also be carbon steel or simple cast iron.

The metallic substrates based on aluminum are advantageously treated by heating same in an oxidizing atmosphere under conditions of time and temperature which make it possible to produce, from the aluminum contained in the alloy, a surface coating of aluminum oxide. In the case of carbon steels or of cast iron, it is also possible to pre-treat same by annealing the iron or steel coated with a layer of aluminum to obtain a coating of an aluminum/iron diffusion layer.

The ceramic substrates preferably utilized are those comprising as the principal constituent: cordierite, alumina, mullite, zirconia, zircomullite, barium titanate, porcelain, thorium oxide, magnesium oxide, steatite, and the carbides of boron or of silicon. In a preferred embodiment of the invention, the coating of aluminum oxide on these ceramic or metallic substrates is effected by application of alumina hydrate followed by calcining, or by the deposition of an aluminum salt followed by calcining, or by the application of a layer of active alumina and calcining.

The cellular honeycomb structure may be in a hexagonal, tetragonal, triangular or undulated form. It should permit the passage of gas through the channels or passages formed during their manufacture by extrusion, lamination, solidifying of components in sheet form, or the like.

Moreover, the supports employed according to the process of the invention are advantageously treated such as to impart to same good thermal stability over time. These treatments, also well known to those skilled in the art, consist especially of a stabilization of the alumina particle or of the aluminum oxide coating with alkaline earth metals, silica and/or the rare earths.

The stabilized supports described in French Pat. Nos. 2,257,335 and 2,290,950, also assigned to Rhone-Poulenc, are suitable for the purpose of the invention.

The metals of the platinum group which are advantageously used in accordance with the invention are selected from among: platinum, rhodium, ruthenium, palladium and iridium.

In the catalysts of the invention, the total content of metal of the platinum group generally ranges from about 0.02 to 0.5% by weight relative to the support. In another preferred embodiment of the invention, the combined content of platinum and palladium in the catalyst generally ranges from 0.02 to 0.4% by weight relative to the support and preferably from 0.04 to 0.25% by weight; that of the metal of the group consisting of iridium and rhodium generally ranges from about 0 to 0.1% by weight and preferably from about 0.002 to 0.02% by weight relative to the support.

In the catalysts according to the invention, the metal or metals of the platinum group are associated with cerium base metal, and, optionally, at least one other base metal. These "other" base metals are selected from among at least one of the following metals: cobalt, zinc, manganese, nickel, tungsten, iron, copper, neodymium, praseodymium, rhenium, chromium, zirconium, lanthanum, tin, calcium, strontium, barium, yttrium, magnesium, titanium and gallium.

Preferred are compositions comprising the following base metals:

(1) Iron and cerium;
(2) Manganese and cerium and iron;
(3) Cerium and iron and gallium and/or yttrium; and
(4) Cerium and iron and barium and/or magnesium and/or yttrium.

The total base metal content relative to the support typically ranges from 0.1 to 11% by weight.

In another preferred embodiment of the invention, when iron and cerium are used as the base metals, the iron content ranges from about 0.1 to 3.5% by weight relative to the support and more preferably from 0.5 to 2%; the cerium content ranges from about 0.3 to 7.5% and preferably from 0.5 to 5.5% by weight relative to the support.

In another preferred embodiment of the invention, when the base metals consist of manganese and cerium and iron, the total content of cerium and iron ranges from 0.1 to 11% by weight relative to the support and preferably from 0.5 to 7.5%; the manganese content ranges from 0.1 to 4% and preferably from 0.1 to 2%; the amount of manganese and iron and cerium is below 15% and preferably below 0.5% by weight relative to the support.

In yet another preferred embodiment, when the base metals consist of cerium, iron, gallium and/or yttrium, the total content of cerium and iron in the catalysts ranges from about 0.1 to 11% by weight relative to the support and preferably from 0.5 to 7.5%; the gallium content ranges from 0.01 to about 10% by weight and preferably from 0.01 to 2%; the yttrium content ranges from 0.01 to 10% and preferably from 0.01 to 2%.

In still another preferred embodiment, when the base metals consist of cerium, iron, barium and/or magnesium and/or yttrium, the total content of cerium and iron in the catalysts ranges from 0.1 to 11% by weight relative to the support and preferably from 0.5 to 7.5%, and the content of the barium and/or magnesium and/or yttrium ranges from 0.01 to 3.5% and preferably from 0.01 to 2%.

Consistent with the process of the invention, in the first step the base metals, necessarily including the cerium, are introduced into the support. Alternatively, all or a portion of the platinum group precious metals are also introduced in said first step (i).

The base metals and, if appropriate, the palladium and the like, may be introduced into the support by any method and, in particular, by impregnation, co-gelation, co-precipitation, etc. Preferably, impregnation of the support is carried out with a solution containing compounds of palladium and of the base metals. Representative compounds are all of the soluble salts of the metals in question. As compounds of palladium, preferably used are palladium chloride, palladium nitrate, tetraamminopalladium(II) dichloride, and the like. In another preferred embodiment of the invention, the salts of iron and of cerium which are used are preferably selected from among ferric nitrate, ammoniacal iron citrate, ferric chloride, cerous nitrate, cerous acetate, cerous chloride and ammoniacal ceric nitrate.

Alternatively, at least a portion of the delayed-action reducing agent is also introduced during this first step of the subject process, but it is preferred to introduce the delayed-action reducing agent during the step (iii) wherein the platinum group precious metals are added, in order to reduce, e.g., the platinum and/or rhodium.

In the second step of the process of the invention, the coated and/or impregnated support originating from the step (i) is activated. The activation temperature ranges from about 120° to 800° C. In terms of the invention, by "activation" there is intended a heat treatment consisting of a drying process under a neutral or oxidizing atmosphere, followed optionally by calcination, also in a neutral or oxidizing atmosphere. Typically, the oxidizing atmosphere is air.

In a third step, the precursor or precursors of the precious metals of the platinum group, together with the delayed-action reducing agents adapted to reduce said precious metal precursor(s) during the step (iv), are introduced. These metals are introduced by impregnation with soluble precursor compounds of the precious metals. In a preferred embodiment, such precursor compounds are hydrated rhodium trichloride, chloroplatinic acid, chloropentaamminorhodium(III) dichloride and tetraamminoplatinum(II) dichloride, bromoplatinic acid, rhodium nitrate and hexachloroiridic acid, palladium nitrate, palladium chloride, or tetraamminopalladium(II) dichloride.

As is also well known to those skilled in the art, the depth of impregnation may be advantageously regulated by addition of a certain quantity of a mineral or organic acid to the solution of the precious metals. Nitric, phosphoric, hydrochloric and hydrofluoric acids, or acetic, citric and oxalic acids, and the like, are conventionally used for this purpose.

The ratio of the number of moles of the delayed-action reducing agent to the total number of gram-atoms of the platinum group precious metals introduced advantageously ranges from 0.1 to 1,000, preferably from 10 to 200.

In the fourth step of the process of the invention, the catalyst is preferably activated in a neutral or oxidizing atmosphere at a temperature ranging from about 300° to 800° C. The activation is preferably carried out at a temperature ranging from 300° to 400° C. for a period of time ranging from about 5 minutes to 10 hours, preferably from about 15 minutes to 5 hours.

The catalysts according to the invention thus prepared have a markedly enhanced initial activity for eliminating the toxic compounds contained in automotive exhaust gases and, particularly, carbon monoxide, unburnt hydrocarbons, and, if appropriate, the oxides of nitrogen which are present therein.

As utilized herein, by the expression catalyst having enhanced or markedly enhanced initial activity, there are intended those catalysts having the following properties:

(1) they catalyze the oxidation of carbon monoxide and unburnt hydrocarbons and the reduction of nitrogen oxides in exhaust gases, as soon as suitable catalytic converter charged therewith is installed in a given vehicle, and without the need for any preliminary conditioning of either the catalyst or the vehicle; and (2) they catalyze the oxidation of carbon monoxide and of ethylene in the presence of excess oxygen, beginning at 130° C. The temperature at which the catalyst converts 50% of the carbon monoxide and 50% of the ethylene is less than 149° C.

The subject catalysts which have enhanced initial activity are also characterized in that:

(i) they consist of particles of precious metals whose average size is small, on the order of a few nanometers: 0.5 to 2 nm, such as those observed by transmission electron microscopy on extracts thereof; and (ii) the small aggregates of precious metals, for all practical purposes, do not adsorb carbon monoxide at ambient temperature.

In order to further illustrate the present invention and the advantages thereof, the following specific examples are given, it being understood that same are intended only as illustrative and in nowise limitative.

EXAMPLE 1

Preparation of a Prior Art Catalyst (A)

100 g of alumina beads were prepared according to the process described in published French Patent Application No. 79/04,810.

These beads had a specific surface of 100 m$^2$/g, a total pore volume of 1.20 cm$^3$/g and a volume of 0.45 cm$^3$/g consisting of macropores having a diameter greater than 1,000 Å.

These beads were impregnated with 120 cm$^3$ of an aqueous solution of cerous nitrate containing 5.5 g of cerium.

After 30 minutes of impregnation, the beads were dried at 150° C. then calcined in air for 3 hours at 550° C.

Same were next impregnated with 110 cm$^3$ of a solution of hexachloroplatinic acid, and of rhodium trichloride hydrate containing 150 mg of platinum and 10 mg of rhodium.

After 30 minutes of impregnation, the beads were dried at 150° C., then calcined for 3 hours at 350° C. in a stream of air circulating at a rate of 200 liters per hour.

The catalyst (A) thus prepared contained 0.150% of platinum, 0.010% of rhodium and 5.5% of cerium, all by weight relative to the carrier.

EXAMPLE 2

Preparation of a Prior Art Catalyst (B)

100 g of the alumina beads as described in Example 1 were impregnated with 120 cm$^3$ of an aqueous solution of iron nitrate, cerium nitrate, copper nitrate and palladium nitrate, containing 1.0 g of iron, 3.0 g of cerium, 0.5 g of copper and 50 mg of palladium.

After 30 minutes of impregnation, the beads were dried at 150° C. and then calcined in air for 3 hours at 550° C. They were next impregnated with 110 cm$^3$ of a solution of hexachloroplatinic acid and of rhodium trichloride containing 100 mg of platinum and 10 mg of rhodium.

The catalyst was then treated as in Example 1.

The catalyst (B) thus prepared contained 0.100% of platinum, 0.050% of palladium, 0.010% of rhodium, 1% of iron, 3% of cerium and 0.5% of copper, all by weight relative to the carrier.

EXAMPLE 3

Preparation of a Prior Art Catalyst (C)

100 g of the alumina beads as described in Example 1 were impregnated as in Example 2 with 120 cm$^3$ of an aqueous solution of ferric nitrate and of cerous nitrate containing 1.3 g of iron and 4.0 g of cerium, then with 110 cm$^3$ of a solution of hexachloroplatinic acid and of rhodium trichloride hydrate containing 150 mg of platinum and 10 mg of rhodium. The catalyst was then treated as in Example 1.

The catalyst (C) thus prepared contained 0.150% of platinum, 0.010% of rhodium, 1.3% of iron and 4.0% of cerium, all by weight relative to the carrier.

EXAMPLE 4

Preparation of a Prior Art Catalyst (D)

100 g of the alumina beads as described in Example 1 were impregnated as in Example 2 with 120 cm$^3$ of an aqueous solution of iron nitrate and of cerium nitrate containing 1.3 g of iron and 4 g of cerium.

After 30 minutes of impregnation, the beads were dried at 150° C. and then calcined in air for 3 hours at 550° C.

They were next impregnated with 110 cm$^3$ of a solution of hexachloroplatinic acid and of rhodium trichloride hydrate containing 150 mg of platinum and 1.0 mg of rhodium and of formaldehyde (0.011 mole, as a 37% aqueous solution thereof).

After 30 minutes of impregnation, the beads were dried at 130° C., then activated for 3 hours.

The catalyst (D) thus prepared, which is the most efficient according to French Pat. No. 2,196,195, contained 0.150% of platinum, 0.010% of rhodium, 1.3% of iron and 4.0% of cerium, all by weight relative to the carrier.

EXAMPLE 5

Preparation of a Prior Art Catalyst (E)

An aqueous suspension of alumina suitable for coating a 1.7-liter ceramic monolithic structure having 400 cells per square inch, was prepared.

The 1.7-liter monolith was immersed in the suspension containing 30% by weight of alumina, at a pH of 3.5.

The monolithic support was drained and dried to empty the channels thereof, and was then calcined for 3 hours at 600° C. The monolith coated in this manner was immersed in an aqueous solution of ferric nitrate, of cerium nitrate and of barium nitrate for 30 minutes, then it was drained and dried at 150° C. and calcined for 3 hours at 550° C. The concentrations of ferric nitrate, cerium nitrate and barium nitrate in the solution were such that, after immersion and calcining, the monolith contained 1.0% by weight of iron, 3.0% by weight of cerium and 1.6% by weight of barium.

The substrate was then impregnated by soaking in an aqueous solution of chloroplatinic acid and of rhodium trichloride hydrate.

The concentrations of hexachloroplatinic acid and of rhodium trichloride hydrate were such that the monolith was impregnated with 150 mg of platinum and 10 mg of rhodium. After 30 minutes of impregnation, the monolith was drained, blown and dried at 150° C. and then activated for 3 hours at 350° C. in a calcining furnace.

The catalyst (E) thus prepared contained 0.150% of platinum, 0.010% of rhodium, 1.0% of iron, 3.0% of cerium and 1.0% of barium, all by weight relative to the carrier.

EXAMPLE 6

Preparation of a Prior Art Catalyst (F)

An aqueous suspension of alumina was prepared, suitable for coating a monolithic metallic structure manufactured from a metal sheet marketed under the trademark FECRALLOY.

The procedure employed for the impregnation was similar to that described in Example 5. In this Example, an aqueous solution of cerium nitrate, palladium nitrate and manganese nitrate was used, the concentrations of which being such that after immersion and calcining, the 1.4-liter monolith contained 3.5% by weight of cerium, 0.030% by weight of palladium and 0.5% of manganese. The substrate was then impregnated by soaking in an aqueous solution of chloroplatinic acid and rhodium trichloride hydrate.

The concentrations of hexachloroplatinic acid and of rhodium trichloride hydrate were such that the monolith was impregnated with 70 mg of platinum and 7 mg of rhodium.

After 30 minutes of impregnation, the monolith was drained and dried at 150° C., then activated for 3 hours at 350° C. in a calcining furnace.

The catalyst (F) thus prepared contained 0.070% of platinum, 0.030% of palladium, 0.007% of rhodium, 3.5% of cerium and 0.5% of manganese, all by weight relative to the carrier.

EXAMPLE 7

Preparation of a Catalyst (G) According to the Invention 100 g of the alumina beads as described in Example 1 were impregnated with 120 cm$^3$ of an aqueous solution of cerous nitrate containing 5.5 g of cerium.

After 30 minutes of impregnation, the beads were dried at 150° C. and then calcined in air for 3 hours at 550° C.

They were next impregnated with 110 cm$^3$ of a solution of hexachloroplatinic acid, of rhodium trichloride hydrate and of furfurol containing 150 mg of platinum, 10 mg of rhodium and 10 g of furfurol.

After 30 minutes of impregnation, the beads were dried at 150° C. and then calcined for 3 hours at 350° C. in a stream of air circulating at a rate of 200 liters per hour.

The catalyst (G) thus prepared contained 0.150% of platinum, 0.010% of rhodium and 5.5% of cerium, all by weight relative to the carrier.

EXAMPLE 8

Preparation of a Catalyst (H) According to the Invention 100 g of the alumina beads as described in Example 1 were impregnated with 120 cm$^3$ of an aqueous solution of iron nitrate, cerium nitrate, copper nitrate and palladium nitrate containing 1.0 g of iron, 3.0 g of cerium, 0.5 g of copper and 50 mg of palladium.

After 30 minutes of impregnation, the beads were dried at 150° C. and then calcined in air for 3 hours at 550° C. They were next impregnated with 110 cm$^3$ of a solution of hexachloroplatinic acid, rhodium trichloride and ethylene glycol diacetate containing 100 mg of platinum, 10 mg of rhodium and 22 g of ethylene glycol diacetate.

The catalyst was then treated as in Example 1.

The catalyst (H) thus prepared contained 0.100% of platinum, 0.050% of palladium, 0.010% of rhodium, 1% of iron, 3% of cerium and 0.5% of copper, all by weight relative to the carrier.

EXAMPLE 9

Preparation of a Catalyst (I) According to the Invention 100 g of the alumina beads as described in Example 1 were impregnated as in Example 3 with 120 cm$^3$ of an aqueous solution of ferric nitrate and cerous nitrate containing 1.3 g of iron and 4.0 g of cerium, then with 110 cm$^3$ of a solution of hexachloroplatinic acid, rhodium trichloride hydrate and ethylene glycol, containing 150 mg of platinum, 10 mg of rhodium and 6.2 g of glycol.

After 30 minutes of impregnation, the beads were then activated for 3 hours at 350° C. in an oxidizing atmosphere in a calcining furnace.

The catalyst (I) thus prepared contained 0.150% of platinum, 0.010% of rhodium, 1.3% of iron and 4.0% of cerium, all by weight relative to the carrier.

EXAMPLE 10

Preparation of a Catalyst (J) According to the Invention 100 g of the alumina beads as described in Example 1 were impregnated as in Example 3 with 120 cm$^3$ of an aqueous solution of iron nitrate and cerium nitrate containing 1.3 g of iron and 4 g of cerium.

After 30 minutes of impregnation, the beads were dried at 150° C. and then calcined in air for 3 hours at 550° C.

They were next impregnated with 110 cm$^3$ of a solution of hexachloroplatinic acid, rhodium trichloride hydrate and glycerol, containing 150 mg of platinum, 10 mg of rhodium and 6.2 g of glycerol.

After 30 minutes of impregnation the beads were activated for 3 hours at 350° C. in an oxidizing atmosphere in a calcining furnace.

The catalyst (J) thus prepared contained 0.150% of platinum, 0.010% of rhodium, 1.3% of iron and 4.0% of cerium, all by weight relative to the carrier.

EXAMPLE 11

Preparation of a Catalyst (K) According to the Invention

An aqueous suspension of alumina suitable for coating a 1.7-liter ceramic monolithic structure having 400 cells per square inch was prepared.

The 1.7-liter monolith was immersed in the suspension containing 30% by weight of alumina at a pH of 3.5.

The monolithic support was drained and dried to empty the channels thereof and then was calcined for 3 hours at 600° C. The monolith coated in this manner was immersed in an aqueous solution of ferric nitrate, cerium nitrate and barium nitrate for 30 minutes, next was drained and dried at 150° C. and then calcined for 3 hours at 550° C. The concentrations of ferric nitrate, cerium nitrate and barium nitrate in the solution were such that, after immersion and calcining, the monolith contained 1.0% by weight of iron, 3.0% by weight of cerium and 1.6% by weight of barium.

The substrate was then impregnated by soaking in an aqueous solution of hexachloroplatinic acid, rhodium trichloride hydrate and ethylene glycol (1,2-ethanediol).

The concentrations of chloroplatinic acid, rhodium trichloride hydrate and ethylene glycol were such that the monolith was impregnated with 150 mg of platinum, 10 mg of rhodium and 30 g of ethylene glycol.

After 30 minutes of impregnation, the monolith was drained, blown and dried at 150° C., then activated for 3 hours at 350° C. in an oxidizing atmosphere in a calcining furnace.

The catalyst (K) thus prepared contained 0.150% of platinum, 0.010% of rhodium, 1.0% of iron, 3.0% of cerium and 1.0% of barium, all by weight relative to the carrier.

EXAMPLE 12

Preparation of a Catalyst (L) According to the Invention

An aqueous suspension of alumina was prepared, suitable for coating monolithic metallic structure manufactured from a metal sheet marketed under the trademark Fecralloy.

The procedure employed for the impregnation was similar to that described in Example 11. In this Example, an aqueous solution of cerium nitrate, palladium nitrate and manganese nitrate was used, the concentrations of which being such that, after immersion and calcining, the 1.4-liter monolith contained 3.5% by weight of cerium, 0.030% by weight of palladium and 0.5% of manganese. The substrate was then impregnated by soaking it in an aqueous solution of hexachloroplatinic acid, rhodium trichloride hydrate and benzyl alcohol.

The concentrations of chloroplatinic acid and rhodium trichloride hydrate were such that the monolith was impregnated with 70 mg of platinum, 7 mg of rhodium and 27 g of benzyl alcohol.

After 30 minutes of impregnation, the monolith was drained and dried at 150° C. and then activated for 3 hours at 350° C. in an oxidizing atmosphere in a calcining furnace.

The catalyst (L) thus prepared contained 0.070% of platinum, 0.030% of palladium, 0.007% of rhodium, 3.5% of cerium and 0.5% of manganese, all by weight relative to the carrier.

EXAMPLE 13

Chemisorption of Carbon Monoxide and Measurement of the Dispersion of Precious Metals by Transmission Electron Microscopy of the Various Catalysts This Example reports the results obtained for the chemisorption of carbon monoxide and the particle sizes of the precious metals, determined by transmission electron microscopy, for the various catalysts (A), (B), (C), (D), (G), (H), (I) and (J) respectively described in Examples 1, 2, 3, 4, 7, 8, 9 and 10.

(i) The test conditions for chemisorption of carbon monoxide were as follows:

The catalyst was first reduced at 350° C. in a stream of hydrogen. The hydrogen adsorbed on the catalyst was removed by sweeping it with a stream of very pure argon at the same temperature. The solid thus prepared was returned to room temperature, while maintaining the sweep of the very pure argon. Known volumes of carbon monoxide were introduced into the stream of argon (1.8 liter/hour), upstream of the catalyst.

The chemisorption being carried out under dynamic conditions, a thermal conductivity measurement cell was employed to determine the change in the residual amount of carbon monoxide in the carrier gas. The surface area of the CO peak obtained was proportional to the amount of CO which remained in the gaseous effluent. The successive injections of CO were followed until peaks having the same surface area were obtained. This surface area, which corresponds to the volume of CO introduced at each injection, was used as a reference.

If n is the number of injections before "constant surface area" peaks were obtained, v—the volume injected each time in cm$^3$.

$S_j$—the surface area of the j injection,

S—the surface area of the invariable peak,

W—the weight of the catalyst, the quantity of CO fixed by the catalyst was, in cm$^3$/g, $$\frac{nS - \epsilon_1^n S_i}{S \times W} \times \sqrt{(NTP)}$$

the volume injected corrected to normal conditions of temperature and pressure (NTP) was:

$$\sqrt{(NTP)} = \frac{\sqrt{T^\circ} \times 760 \times 273}{P \times (273 + T^\circ)}$$

(ii) Measurement of the dispersion of the precious metals by transmission electron microscopic examination of the catalysts after chemisorption of carbon monoxide:

Direct examination of the catalysts having a low content of precious metals (approximately 0.15%) did not permit the metal particles to be observed. Consequently, transmission electron microscopic examination of the catalysts (A), (B), (C), (D), (G), (H), (I) and (J) respectively described in Examples 1, 2, 3, 4, 7, 8, 9 and 10 was carried out on extracts obtained by dissolving the carrier in 1% strength hydrofluoric acid under the conditions described in G. Dalmai-Imelik, C. Leclercq and I. Mutin, *Journal de microscopie*, 20, No. 2, 1974, pp. 123–132.

A series of metal crystallites whose sizes varied from 25 to 80 Å was observed in all of the catalysts. The average size determined for one hundred particles for each preparation is reported in the following Table I which sets forth the results obtained with the various catalysts.

(iii) Results obtained with the catalysts (A), (B), (C), (D), (G), (H), (I) and (J) for the chemisorption of carbon monoxide and values of average particle sizes of precious metals, estimated by electron microscopy on extracts thereof:

TABLE I

| Example No. | Catalyst reference | Amount of carbon monoxide chemisorbed by the catalyst, cm$^3$/g measured under NTP conditions | Average size of metal particles observed by microscopy, nanometers |
|---|---|---|---|
| Prior Art | | | |
| 1 | A | 0.146 | 1.4 |
| 2 | B | 0.155 | 1.6 |
| 3 | C | 0.140 | 1.7 |
| 4 | D | 0.103 | 2.5 |
| Invention | | | |
| 7 | G | 0.027 | 1.8 |
| 8 | H | 0.020 | 0.5 |
| 9 | I | 0.009 | 1.2 |
| 10 | J | 0.011 | 1.4 |

EXAMPLE 14

Initial Oxidizing Activity of the Catalysts for the Conversion of Carbon Monoxide and Ethylene The procedure employed consisted of heating the catalysts for 30 minutes at 593° C. under nitrogen, cooling these catalysts under a synthetic mixture of gas containing 1% of carbon monoxide, 0.15% of ethylene, 3% of oxygen, the remainder being N$_2$, at a VVH of 10,000 h$^{-1}$, and then in measuring the minimum temperature permitting the oxidation of 50% of the carbon monoxide and 50% of the ethylene.

The estimation of these compounds was carried out at a temperature between 593° C. and 50° C. by the following usual techniques:
(a) CO: infrared absorption (COSMA Rubis 3000 analyzer); and
(b) HC: flame ionization analysis (IPM analyzer).

In the following Table II are reported the results obtained with the catalysts (A), (B), (C), (D), (E), (F), (G), (H), (I), (J), (K) and (L) respectively described in Examples 1 to 12.

TABLE II

| Example No. | Catalyst reference | Minimum gas inlet temperature for 50% conversion of carbon monoxide | of ethylene |
|---|---|---|---|
| Prior Art | | | |
| 1 | A | 225 | 245 |
| 2 | B | 186 | 186 |
| 3 | C | 232 | 270 |
| 4 | D | 223 | 250 |
| 5 | E | 220 | 240 |
| 6 | F | 205 | 210 |
| Invention | | | |
| 7 | G | 135 | 148 |
| 8 | H | 108 | 108 |
| 9 | I | 138 | 138 |
| 10 | J | 125 | 125 |
| 11 | K | 132 | 135 |
| 12 | L | 145 | 149 |

EXAMPLE 15

Initial Activity of the Catalysts for the Removal of Carbon Monoxide and of Nitrogen Oxide From the Exhaust Gases of An Engine Regulated at Richness One The procedure consisted of passing, over a 500 cm$^3$ volume of catalyst contained in a cylindrical reactor permitting radial flow ($\phi$100 mm, h 64 mm), gases originating from the exhaust of a spark ignited internal combustion engine regulated to operate at richness 1 (voltage of the oxygen probe placed in the gases at the engine outlet equal to 600 mV). An electrical heating device permitted the temperature of the gases to be adjusted to exactly 450° C. in the region of the inlet to the catalytic converter. A bypass circuit enabled the gases to be passed over the catalyst only after stabilized engine operating conditions were obtained.

The rate of flow of the exhaust gases passing over the catalyst was 25 Nm$^3$/hour. These gases initially contained 3,200±ppm of NO (chemiluminescence analysis) and 0.40±0.01% of CO (infrared radiation absorption analysis).

In the Table III which follows are reported the results obtained using the catalysts (A), (B), (C), (D), (E), (F), (G), (H), (I), (J), (K) and (L) respectively described in Examples 1 to 12, as directly prepared and without any other preconditioning being performed thereon.

TABLE III

| Example No. | Catalyst reference | Percentage of CO removed after: 10 min | 30 min | 60 min | Percentage of NO$_x$ removed after: 10 min | 30 min | 60 min |
|---|---|---|---|---|---|---|---|
| Prior Art | | | | | | | |
| 1 | A | 34 | 51 | 53 | 44 | 55 | 58 |
| 2 | B | 48 | 59 | 61 | 51 | 62 | 63 |
| 3 | C | 36 | 54 | 55 | 48 | 58 | 61 |
| 4 | D | 37 | 45 | 58 | 35 | 53 | 58 |
| 5 | E | 35 | 50 | 61 | 38 | 57 | 60 |
| 6 | F | 30 | 47 | 53 | 34 | 52 | 59 |
| Invention | | | | | | | |
| 7 | G | 70 | 77 | 78 | 80 | 87 | 89 |
| 8 | H | 79 | 80 | 81 | 88 | 93 | 93 |
| 9 | I | 83 | 84 | 84 | 90.5 | 95.5 | 96 |
| 10 | J | 90 | 90 | 90 | 93 | 95 | 97 |
| 11 | K | 89 | 91 | 91 | 92 | 96 | 97.5 |
| 12 | L | 76 | 77 | 78 | 87.5 | 92 | 93 |

EXAMPLE 16

Initial Activity of the Catalysts for the Removal of Carbon Monoxide, Unburnt Hydrocarbons and Nitrogen Oxides from Vehicle Exhaust Gases The vehicle employed for these tests was a Renault 18 USA type having a 1,647 cm$^3$ engine equipped with a Bosch L-Jetronic electronic fuel injection device, regulated by means of an oxygen probe.

The measurement of the exhaust emissions from this vehicle was carried out on a rolling road test bed according to the procedure CVS C/H in accordance with American Federal Standards.

The base emissions of the vehicle, without a catalytic converter were as follows:
(i) CO: 15.1 g/mile
(ii) HC: 2.9 g/mile
(iii) NO$_x$: 4.9 g/mile For testing the bead catalysts, an experimental catalytic converter of radial flow type having a volume of 1,700 cm$^3$, manufactured according to the principle described in French Pat. No. 74/06,395, was installed in the exhaust circuit, at a distance of approximately 1.60 m from the engine.

The ceramic and metal monoliths were mounted in welded metal cases and installed in the location provided initially by the manufacturer in the exhaust circuit, at a distance of approximately 0.80 m from the engine.

In the Table IV which follows are reported the results obtained with the catalysts (A), (B), (C), (D), (E), (F), (G), (H), (I), (J), (K) and (L) respectively described in Examples 1 to 12. Each test was carried out with absolutely fresh catalyst as directly prepared, without operating the test vehicle in that time period between installation of the catalytic converter charged with the fresh catalyst and commencement of the testing.

TABLE IV

| Example No. | Catalyst reference | Emissions, g/mile CO | HC | NO$_x$ |
|---|---|---|---|---|
| Prior Art | | | | |
| 1 | A | 2.60 | 0.64 | 0.70 |
| 2 | B | 2.39 | 0.53 | 0.64 |
| 3 | C | 2.51 | 0.60 | 0.75 |
| 4 | D | 2.37 | 0.58 | 0.80 |
| 5 | E | 2.30 | 0.57 | 0.77 |
| 6 | F | 2.85 | 0.70 | 0.92 |
| Invention | | | | |
| 7 | G | 1.85 | 0.38 | 0.45 |
| 8 | H | 1.63 | 0.36 | 0.40 |
| 9 | I | 1.69 | 0.37 | 0.39 |
| 10 | J | 1.48 | 0.31 | 0.35 |

TABLE IV-continued

| Example No. | Catalyst reference | Emissions, g/mile | | |
|---|---|---|---|---|
| | | CO | HC | NO$_x$ |
| 11 | K | 1.80 | 0.32 | 0.42 |
| 12 | L | 1.95 | 0.39 | 0.47 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a catalyst adapted for the treatment of internal combustion engine exhaust gases, said catalyst comprising a support impregnated with (i) at least one platinum group precious metal, and with (ii) cerium base metal, or a combination of cerium and at least one other base metal, which process comprises (1) impregnating a catalyst support with solutions of precursor compounds of said cerium base metal, or of said cerium base metal and of at least one other base metal, wherein said other base metal comprises cobalt, zinc, manganese, nickel, tunsten, iron, copper neodymium, praseodymium, rhenium, chromium, zirconium, lanthanum, tin, calcium, strontium, barium, yttrium, magnesium, titanium or gallium, (2) activating said impregnated support, under a neutral or oxidizing atmosphere, at a temperature ranging from 120° to 800° C., (3) impregnating said catalyst support with solutions of precursor compounds of said at least one platinum group precious metal, wherein said platinum group precious metal comprises platimum, rhomidum, ruthenium, palladium or iridium, together with a delayed-action organic reducing agent, inactive under cold conditions, which effects reduction of said platinum group precious metal precursor compounds, but not of any cerium or other base metal precursor compounds, under the conditions of the step (4) below, and (4) activating said impregnated catalyst, also under a neutral or oxidizing atmosphere, at a temperature ranging from 300° to 800° C.

2. The process as defined by claim 1, said catalyst base metals comprising (a) iron and cerium, (b) manganese, cerium and iron, (c) cerium, iron and gallium and or yttrium, or (d) cerium, iron and barium and/or magnesium and/or yttrium.

3. The process as defined by claim 1, said platinum group precious metal precursor compounds comprising hydrated rhodium trichloride, chloroplatinic acid, chloropentaammino-rhodium(III) dichloride, tetraamminoplatinum(II) dichloride, bromoplatinic acid, rhomdium nitrate, hexachloroiridic acid, palladium nitrate, palladium chloride, or tetraamminopalladium(II) dichloride.

4. The process as defined by claim 1, said delayed-action organic reducing agent comprising ethylene glycol (1,2-ethanediol), butylene glycol (1,3-butanediol), tetramethylene glycol (2,3-methylbutanediol), isoamylene glycol (3-methyl-1,3-butanediol), trimethylene glycol (1,3-propanediol), propylene glycol (1,2-propanediol), glycerol (propanetriol), sucrose, tetrahydrofurfuryl alcohol, phenol (hydroxybenzene), furfurol (2-furylmethanol), benzyl alcohol (α-hydroxytoluene), hexahydrobenzyl alcohol, ortho-cresol (2-hydroxytoluene), ethylene glycol diacetate, glucose, starch, 2-allyloxyethanol (glycol monoallyl ether), 2-butoxyethanol (glycol monobutyl ether), 4-methyl-1,3-dioxolan-2-one, 1,2-propanediol diacetate, 1,3-propanediol diacetate, diacetin (1,3-glycerol diacetate), 1,2-glycerol dimethyl ether (2,3-dimethoxypropanol), α-monoacetin or α-monobutyrin.

5. The process as defined by claim 1, said catalyst support comprising particulates of silica, alumina, aluminosilicate or mixed oxides.

6. The process as defined by claim 1, said catalyst support comprising an oxide-coated metallic substrate.

7. The process as defined by claim 1, said catalyst support comprising an oxide-coated ceramic substrate.

8. The process as defined by claim 1, said catalyst support comprising a honeycomb.

9. The process as defined by claim 1, said product catalyst comprising a total amount of platinum group precious metal ranging from 0.02 to 0.5% by weight, based upon the weight of the support.

10. The process as defined by claim 9, said product catalyst comprising a total amount of base metal ranging from 0.1 to 11% by weight, based upon the weight of the support.

11. The process as defined by claim 1, the ratio of the number of moles of delayed-action organic reducing agent to the total number of gram-atoms of platinum group precious metals ranging from 0.1 to 1,000.

12. The process as defined by claim 1, wherein the catalyst support is impregnated with at least a portion of the precursor compounds of the platinum group precious metals and with at least a portion of the delayed-action organic reducing agent in the step (3) thereof.

13. The process as defined by claim 1, wherein the catalyst support is impregnated with at least a portion of the delayed-action organic reducing agent in the step (3) thereof.

* * * * *

UNITED STATES PATENT AND TRADEMARK OFFICE
CERTIFICATE OF CORRECTION

PATENT NO. : 4,581,343
DATED : April 8, 1986
INVENTOR(S) : Blanchard et al

It is certified that error appears in the above-identified patent and that said Letters Patent is hereby corrected as shown below:

Claim 1, column 15, line 35, amend "platimum, rhomidum" to --platinum, rhodium--.

Claim 3, column 16, line 2, amend "rhomdium" to --rhodium--.

Signed and Sealed this

Third Day of March, 1987

*Attest:*

DONALD J. QUIGG

*Attesting Officer*     *Commissioner of Patents and Trademarks*